United States Patent
Lee et al.

(10) Patent No.: US 8,032,777 B2
(45) Date of Patent: Oct. 4, 2011

(54) MEMORY CARD CONTROL APPARATUS AND PROTECTION METHOD THEREOF

(75) Inventors: An-Ming Lee, Hsin-Chu Hsien (TW); Zhen-Guo Sun, Suzhou (CN); Ying-Hui Zhu, Suzhou (CN); Chih-Ching Chien, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 889 days.

(21) Appl. No.: 11/956,324

(22) Filed: Dec. 13, 2007

(65) Prior Publication Data

US 2008/0148077 A1    Jun. 19, 2008

(30) Foreign Application Priority Data

Dec. 19, 2006 (TW) .............................. 95147686 A

(51) Int. Cl.
  *G06F 1/32* (2006.01)
(52) U.S. Cl. ......................................... 713/340; 714/14
(58) Field of Classification Search .................. 713/340; 714/14
See application file for complete search history.

(56) References Cited

U.S. PATENT DOCUMENTS

| 5,898,557 | A | * | 4/1999 | Baba et al. ..................... 361/103 |
| 6,557,106 | B1 | | 4/2003 | Yuzawa |
| 7,443,144 | B2 | * | 10/2008 | Uguen .......................... 323/224 |
| 7,724,390 | B2 | * | 5/2010 | Imai ............................. 358/1.18 |
| 2003/0116624 | A1 | | 6/2003 | Chen |
| 2006/0226704 | A1 | * | 10/2006 | Tsuchiya ........................ 307/32 |

FOREIGN PATENT DOCUMENTS

| TW | 561414 | 11/2003 |
| TW | 1255090 | 5/2006 |

* cited by examiner

*Primary Examiner* — Thuan Du
(74) *Attorney, Agent, or Firm* — Thomas, Kayden, Horstemeyer & Risley, LLP

(57) ABSTRACT

A control apparatus for accessing a memory card includes a bus, a detecting circuit, and an adjusting circuit. The bus is regarded as a signal transmission line between the control apparatus and the memory card. The bus has a power signal transmission line for providing the memory card with a power signal. The detecting circuit detects an operating status of the control apparatus and generates an indication signal when the operating status exceeds a predetermined operating range. The adjusting circuit is coupled to the bus and detecting circuit, and is utilized for adjusting a current passing through the power signal transmission line according to the indication signal without closing the power signal transmission line thereby making the operating status operated within the predetermined operating range.

20 Claims, 4 Drawing Sheets

MEMORY CARD CONTROL APPARATUS AND PROTECTION METHOD THEREOF

BACKGROUND OF THE INVENTION

1. Field of the Invention

The present invention relates to a memory card control apparatus and protection method thereof, and more particularly, to a memory card control apparatus having over-temperature protection or over-current protection and a protection method thereof.

2. Description of the Prior Art

To be able to record various types of data, different kinds of memory cards have been developed, such as secure digital (SD) cards, memory stick (MS) cards, compact flash (CF) cards, etc. For users can access the above memory cards conveniently, a memory card control system (i.e. a card reader) capable of reading data from different kinds of memory cards is needed. In general, a common memory card control system has a single-slot structure or multiple-slot structure, wherein the single-slot structure is utilized to access memory cards with a single structure or similar structures, and the multiple-slot structure is utilized to access memory cards of different characteristics. With constant improvements of the data access mechanism, a memory card control system with a multiple-slot structure has become a mainstream specification nowadays.

However, because there are many kinds of memory cards, putting a memory card into a wrong slot will often occur. This causes inner short circuit/errors of the memory card or the memory card control system, and damages inner data contents of the memory card, even resulting in damage to the memory card or the memory card control system. Additionally, improper usage or operational environments such as a high-humidity or high-temperature environment may cause unexpected damages. Therefore, while designing the memory card control system, related protection schemes configured to protect the memory card control system are included to protect the memory card control system, memory card, or inner data contents of the memory card from being damaged. Generally, a conventional over-current protection scheme directly cuts off a power supply corresponding to a slot of the memory card to avoid errors or damage to the memory card control system. However, the power supply corresponding to the slot of the memory card may simultaneously be provided for other parts of the memory card control system. Thus cutting off the power supply corresponding to the slot of the memory card may cause the memory card control system to lose partial operating functions. The related details of this conventional scheme can be found in the specification of Taiwanese patent publication no. 1255090.

SUMMARY OF THE INVENTION

One objective of the present invention is therefore to provide a memory card control apparatus and protection method thereof for adjusting a current magnitude passing through a slot of the memory card control apparatus without powering down the slot, to solve the abovementioned problems.

According to an embodiment of the present invention, a control apparatus for accessing a memory card is disclosed. The control apparatus comprises: a bus, a detecting circuit and an adjusting circuit. The bus is utilized to serve as a signal transmission line between the control apparatus and the memory card, and the bus has a power signal transmission line for providing the memory card with a power signal. The detecting circuit is utilized to detect an operating status of the control apparatus and generate an indication signal when the operating status exceeds a predetermined operating range. The adjusting circuit is coupled to the bus and the detecting circuit, and is utilized to adjust a current passing through the power signal transmission line according to the indication signal without cutting off the power signal to make the operating status operated within the predetermined operating range.

According to another embodiment of the present invention, a protection method for a memory card control apparatus is disclosed, where the memory card apparatus has a bus, and the bus has a power signal transmission line to output a power signal. The protection method comprises: detecting an operating status of the control apparatus and generating an indication signal when the operating status exceeds a predetermined operating range; and adjusting a current passing through the power signal transmission line according to the indication signal without cutting off the power signal to make the operating status operated within the predetermined operating range.

According to yet another embodiment of the present invention, a protection method for a memory card control apparatus is disclosed, where the memory card apparatus has a bus, and the bus has a power signal transmission line to output a power signal. The protection method comprises: detecting a temperature status of an ambient environment, and generating an indication signal when the temperature status exceeds a predetermined temperature range; and adjusting a current passing through the power signal transmission line according to the indication signal without cutting off the power signal to make the temperature status operated within the predetermined temperature range.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
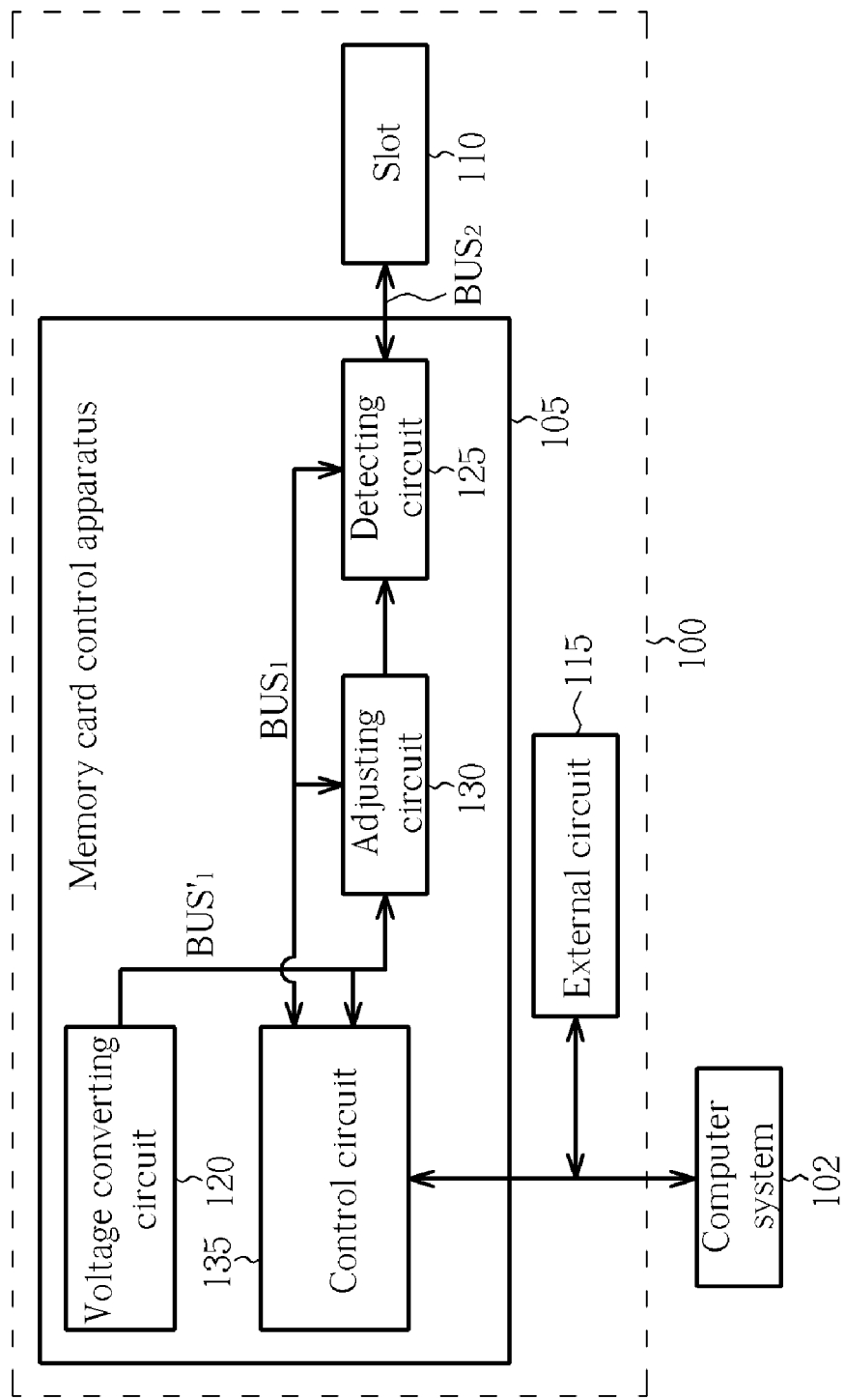
FIG. 1 is a diagram illustrating a memory card control apparatus according to one embodiment of the present invention.

Please refer to FIG. 1. FIG. 1 is a diagram illustrating a memory card control system 100 according to an embodiment of the present invention. As shown in FIG. 1, the memory card control system 100 is coupled to a computer system 102, and comprises a memory card control apparatus 105, at least a slot 110 and an external circuit 115, where the memory card control apparatus 105 is connected with the slot 110 through a bus $BUS_2$, and the bus $BUS_2$ comprises at least a power signal transmission line for providing a power signal to the slot 110, making the memory card able to operate according to the power signal when inserted into the slot 110. Furthermore, the memory card control apparatus 105 comprises a voltage converting circuit 120, at least a detecting circuit 125, at least an adjusting circuit 130 and a control circuit 135. It should be noted that, for simplicity, only one slot 110, one detecting circuit 125 and one adjusting circuit 130 are shown in FIG. 1. However, the number of slots 110, detecting circuits 125 and adjusting circuits 130 is not meant to be a limitation of the present invention. In other embodiments, the memory card control apparatus 100 can comprise a plurality of slots 110, a plurality of detecting circuits 125 and a plurality of adjusting circuits 130. In an embodiment of the present invention, provided that inner circuits of the memory card control apparatus 105 and the memory card inserted in the slot 110 are operated with the same operating voltage, the voltage converting circuit 120 is utilized to convert an external power source of the memory card control apparatus 105 into a converted power source needed by both the inner circuits of the memory card control apparatus 105 and the memory card inserted in the slot 110 (e.g. converting the external power source of 5 volts into a power source of 3.3 volts), and transmitting the converted power source to both the memory card control apparatus 105 and the memory card inserted in the slot 110 by the inner power bus $BUS'_1$. According to one embodiment of the present invention, the voltage converting circuit 120 is a linear regulator. The detecting circuit 125 is utilized to detect an operating status of the memory card control apparatus 105 (such as the current passing through the power signal transmission line of the bus $BUS_2$ is over, or the temperature of the ambient environment is too high), and when the operating status exceeds a predetermined operating range, the detecting circuit 125 generates an indication signal and stores the indication signal into register(s) of the control circuit 135 through the inner signal bus $BUS_1$. The control circuit 135 delivers the indication signal to the adjusting circuit 130 for controlling the adjusting circuit 130, and the adjusting circuit 130 is then utilized to adjust an operating status of the memory card control apparatus 105 according to the indication signal without cutting off the power signal to make the operating status of the memory card control apparatus 105 operated within the predetermined operating range.

Figure 2:
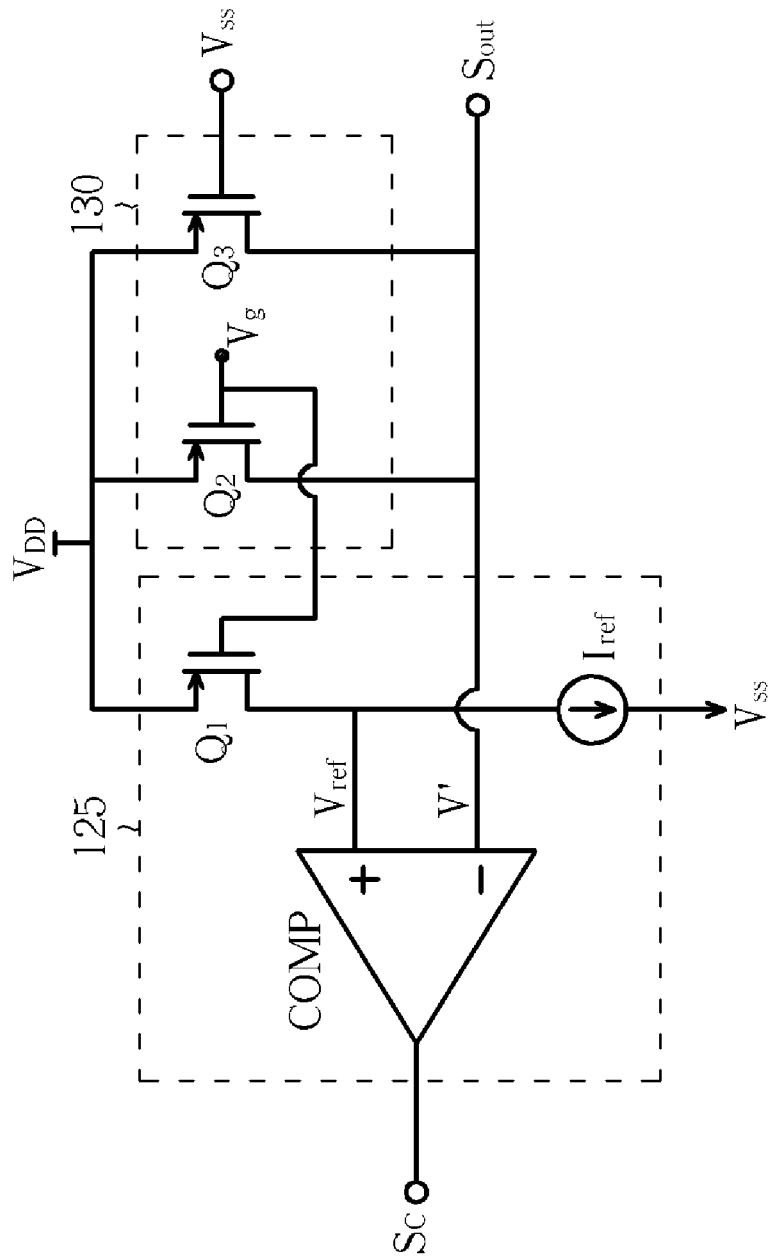
FIG. 2 is a diagram illustrating a detecting circuit and an adjusting circuit shown in FIG. 1 according to one embodiment of the present invention.

Please refer to FIG. 2. FIG. 2 is a diagram illustrating the detecting circuit and the adjusting circuit shown in FIG. 1 according to one embodiment of the present invention. As shown in FIG. 2, the detecting circuit 125 comprises a comparator COMP, a transistor $Q_1$ and a reference current source $I_{ref}$, and the adjusting circuit 130 comprises transistors $Q_2$ and $Q_3$, where the reference current source $I_{ref}$ is a predetermined current source and a gate voltage of the transistor $Q_1$ is a fixed voltage value $V_g$. Therefore, the reference current source $I_{ref}$ and the transistor $Q_1$ form a current path, a non-inverting input (+) of the comparator COMP has a predetermined reference voltage $V_{ref}$, and an output signal $S_{out}$ is regarded as a power signal and transmitted to the slot 110 shown in FIG. 1. Further, a power source $V_{DD}$ shown in FIG. 2 is the converted power source provided by the voltage converting circuit 120 shown in FIG. 1. Under normal operations, a voltage level of the output signal $S_{out}$ (i.e. a voltage level V' at an inverting output (−) of the comparator COMP) is higher than the reference voltage $V_{ref}$. At this time, the output voltage level of the comparator COMP maintains a low logic level. On the other hand, owing to gate voltages of both the transistor $Q_2$ and the transistor $Q_3$ being respectively connected to fixed voltages $V_g$ and $V_s$, the conducting resistance of the transistors can be viewed as a fixed value. However, provided that the voltage level V' is smaller than the reference voltage $V_{ref}$, representing that the output signal $S_{out}$ has a higher current value (i.e. a current magnitude passing through the slot 110 at this time becomes larger). Therefore, when the voltage level V' is smaller than the reference voltage $V_{ref}$, the comparator COMP will output an indication signal $S_c$ with a high logic level, and the indication signal $S_c$ is transmitted to the gate voltages of the transistor $Q_1$ and transistor $Q_2$ respectively to boost original voltage levels, thus turning off the transistors $Q_1$ and $Q_2$, provided that an aspect ratio of the transistor $Q_2$ is larger than an aspect ratio of the transistor $Q_3$. Therefore, even though the transistor $Q_3$ stays on at this time, because the resistance value of the transistor $Q_3$ is larger than that of the transistor $Q_2$, the adjusting circuit 130 only allows current with smaller magnitude to pass through, thereby effectively restricting the current magnitude passing through the slot 110. In other words, when the over-current condition occurs (i.e. when the transistors $Q_1$ and $Q_2$ are turned off and the transistor $Q_3$ is turned on), a current (such as a conducting current passing through the transistor $Q_3$ or a predetermined current) is still provided to the memory card inserted in the slot 110 for allowing the memory card to perform a data access operation.

In another embodiment of the present invention, provided that the inner circuits of the memory card control apparatus 105 and the memory card inserted in the slot 110 operate with different operating voltages, the voltage converting circuit 120 is only utilized to convert the external power source of the memory card control apparatus 105 into the converted power source needed by the inner circuits of the memory card control apparatus 105 (such as converting the external power source of 5 volts into the converted power source of 3.3 volts). The adjusting circuit 130 is implemented with a power supply circuit configured to further convert the converted power source provided by the voltage converting circuit 120 to a power source needed by the memory card inserted in the slot 110 (e.g. converting the converted power source of 5 volts into a power source of 1.5-1.8 volts). At this time, as the adjusting circuit 130 serves as a power supply circuit, it can adjust a maximum current according to the indication signal to achieve the objective of restricting the maximum current magnitude passing through the slot 110. This alternative design described above also falls within the scope of the present invention.

Figure 3:
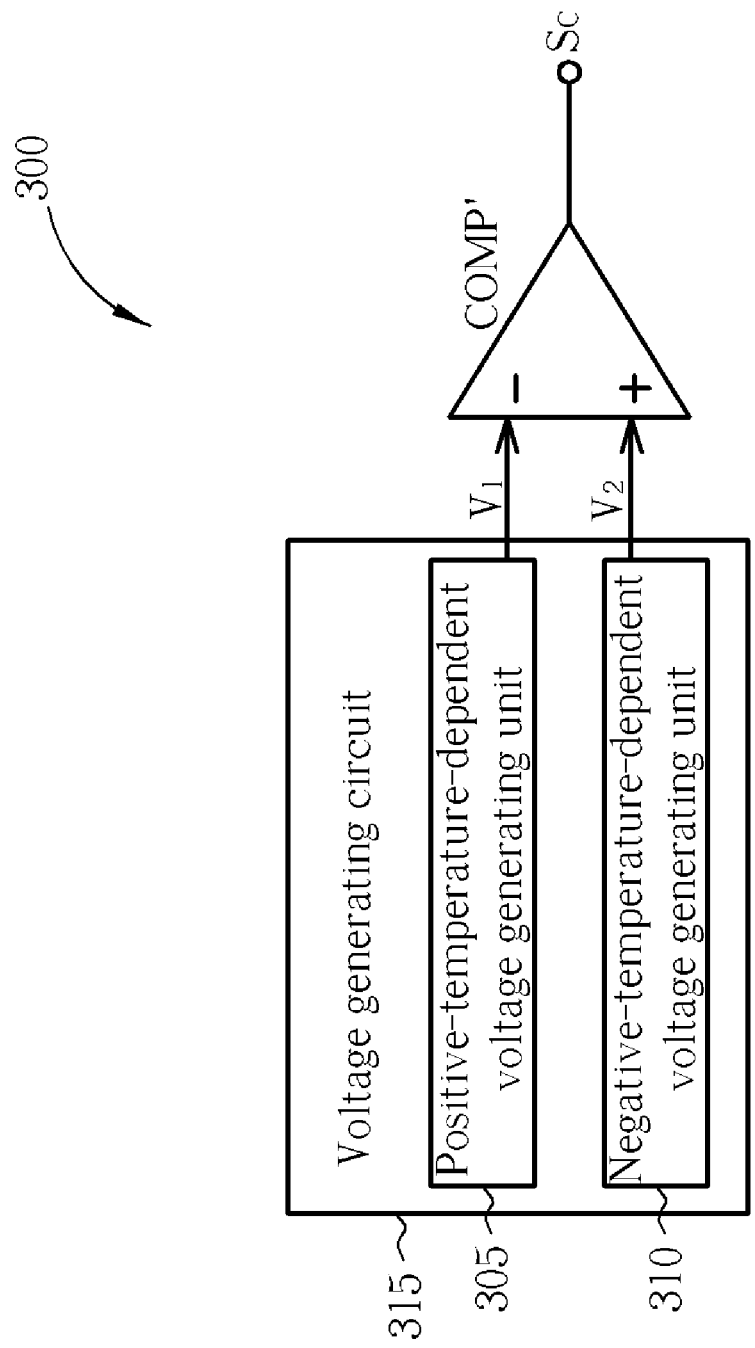
FIG. 3 is a diagram illustrating a detecting circuit for detecting a temperature status of an environment according to one embodiment of the present invention.

Furthermore, besides detecting the current passing through the power signal transmission line, detecting a temperature status of the ambient environment can also protect the memory card inserted in the slot 110 from being damaged without cutting of the power signal. Please refer to FIG. 3. FIG. 3 is a diagram illustrating a detecting circuit 300 for detecting a temperature status of an ambient environment according to one embodiment of the present invention. Please note that, in this embodiment, the detecting circuit 300 is combined with the adjusting circuit 130 (consisting of a plurality of transistors) shown in FIG. 2 to achieve the objective of adjusting a current magnitude passing through the slot 110. In another embodiment, however, the adjusting circuit 300 can be implemented using a power supply circuit to achieve the objective of restricting the maximum current magnitude passing through the slot 110 by adjusting a maximum supplied current. This alternative design also falls within the scope of the present invention.

As shown in FIG. 3, the detecting circuit 300 comprises a voltage generating circuit 315 and a comparator COMP', wherein the voltage generating circuit 315 comprises a positive-temperature-dependent voltage generating unit 305 and a negative-temperature-dependent voltage generating unit 310. The negative-temperature-dependent voltage generating unit 305 generates a voltage $V_1$ according to negative temperature characteristics of the transistors, while the positive-temperature-dependent voltage generating unit 310 generates a voltage $V_2$ according to positive temperature characteristics of the transistors. Taking a bipolar junction (BJT) transistor as an example, a voltage difference of the base-emitter junction (i.e. a voltage difference between an emitter and a base) corresponding to a negative correlation with respect to temperature can be used as the voltage $V_1$, and a thermal voltage corresponding to a positive correlation with respect to temperature can be used as the voltage $V_2$. While operating at a lower temperature status of the ambient environment, the voltage $V_2$ will be smaller than the voltage $V_1$, thus an output of the comparator COMP' maintains a low logic level; on the other hand, while operating at a higher temperature status of ambient the environment (i.e. the temperature status of the environment exceeds a predetermined temperature range), owing to the voltage $V_2$ being positively correlated with the temperature and the voltage $V_1$ being negatively correlated with the temperature (i.e. the higher the temperature, the higher the voltage $V_2$ and the lower the voltage $V_1$), the voltage $V_2$ will be larger than the voltage $V_1$, the comparator COMP' will output the indication signal $S_c$ with a high logic level, and store the indication signal $S_c$ to the control circuit 135 through the inner signal bus $BUS_1$. The control circuit 135 then transmits the indication signal $S_c$ to the adjusting circuit 130 for controlling the adjusting circuit 130. As a result, the adjusting circuit 130 adjusts the current magnitude passing through the slot 110 according to the indication signal $S_c$ without cutting off the power signal to thereby make the operating status of the memory card control apparatus 105 operated within the predetermined operating range. Furthermore, the detecting circuit 300 used for detecting the temperature status of the ambient environment can also compare a reference voltage (i.e. a temperature-invariant voltage) with a voltage correlated with a temperature coefficient. When the voltage correlated with the temperature coefficient is larger or smaller than the reference voltage, the indication signal is generated to enable the over-temperature protection. This alternative design also falls within the scope of the present invention.

In addition, to solve problems occurring when a linking mechanism between the memory card control system 100 and the computer system 120 has errors or is cut off, resulting in a fact that conventional over-current protection mechanism fails to inform users through the computer system 102, the memory card control apparatus 100 in the above embodiment can have an alert device disposed in the external circuit 115, wherein the alert device outputs a specific alarm signal according to the indication signal stored in the control circuit 135. For example, the alert device can be implemented by an LED (Light Emitting Diode) display or a speaker. Additionally, in another embodiment, if no error or disconnection occurs in the linking mechanism between the memory card control system 100 and the computer system 120, the computer system 102 is still able to inform users of information regarding whether the memory card is inserted into the wrong slot. As connection between the memory card control system 100 and the computer system 120 can also be implemented by other kinds of buses, and is not limited to be implemented by the universal serial bus only, when the detecting circuit 125 of the memory card control apparatus 105 generates the indication signal, the control circuit 135 can inform the computer system 102 by setting a software variable (i.e. writing the specific software variable into a predetermined register) and triggering an interrupt signal. An application program of the computer system 102 at this time only needs to check the data content of the specific software variable and is then able to inform users of information regarding whether the memory card is inserted into the wrong slot or not.

Figure 4:
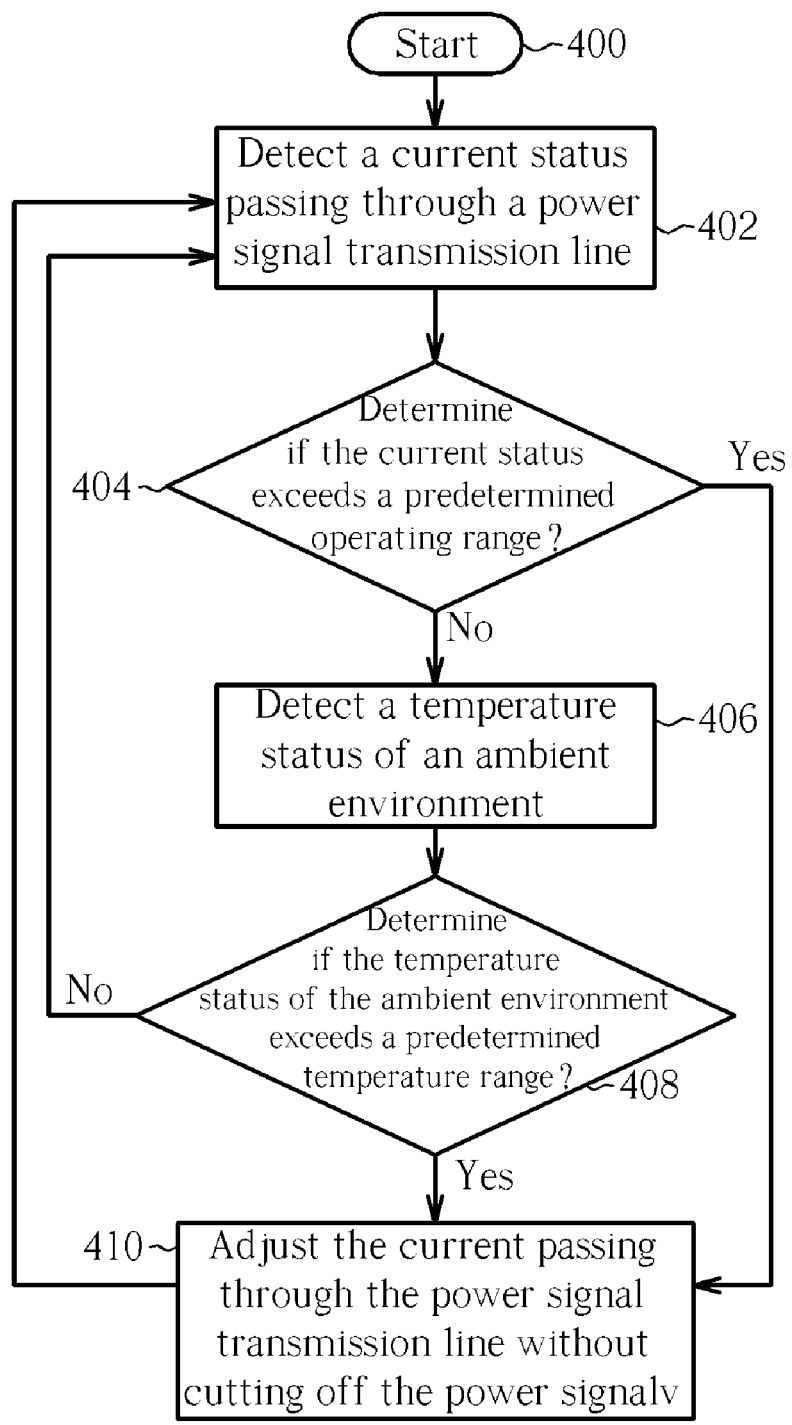
FIG. 4 is a flowchart of the protection method according to one embodiment of the present invention.

Please refer to FIG. 4. FIG. 4 is a flowchart of a protection method according to one embodiment of the present invention. The protection method is applied to a memory card control apparatus (i.e. the memory card control apparatus 105 having the circuit structure shown in FIG. 1). It should be noted that if the same result is substantially achieved, the steps of the flowchart shown in FIG. 4 need not be in the exact order shown therein. The detailed description of the steps is as below.

Step 400: Start.

Step 402: Detect a current status passing through a power signal transmission line.

Step 404: Determine if the current status exceeds a predetermined operating range. If the current status exceeds the predetermined operating range, proceed to step 410; otherwise, proceed to step 406.

Step 406: Detect a temperature status of an ambient environment.

Step 408: Determine if the temperature status of the ambient environment exceeds a predetermined temperature range. If the temperature status of the environment exceeds the predetermined temperature range, proceed to step 410; otherwise, return to step 402 to keep monitoring the current status.

Step 410: Adjust the current passing through the power signal transmission line without cutting off the power signal. Then, return to step 402 to keep monitoring the current status.

The detailed description of the memory card control apparatus 105 mentioned above has been disclosed. As a person skilled in this art can readily understand the operation of each step in FIG. 4 after reading the above disclosure, further description is omitted here for brevity.

Those skilled in the art will readily observe that numerous modifications and alterations of the device and method may be made while retaining the teachings of the invention.

What is claimed is:

1. A control apparatus for accessing a memory card, comprising:
   a bus, for serving as a signal transmission line between the control apparatus and the memory card, the bus having a power signal transmission line for providing the memory card with a power signal;
   a detecting circuit, for detecting an operating status of the control apparatus and generating an indication signal when the operating status exceeds a predetermined operating range; and
   an adjusting circuit, coupled to the bus and the detecting circuit, for adjusting a current passing through the power signal transmission line according to the indication signal without cutting off the power signal to make the operating status of the control apparatus operated within the predetermined operating range.

2. The apparatus of claim 1, wherein the operating status is a current status passing through the power signal transmission line.

3. The apparatus of claim 1, wherein the detecting circuit comprises:
   a current path, having a predetermined current passing through, resulting in a predetermined voltage on the current path; and
   a comparator, coupled to the current path and the power signal transmission line, for comparing the predetermined voltage with the power signal to generate the indication signal.

4. The apparatus of claim 1, wherein the adjusting circuit is a voltage supply circuit for adjusting a current magnitude passing through the power signal transmission line according to the indication signal.

5. The apparatus of claim 1, wherein the operating status is a temperature status of an ambient environment.

6. The apparatus of claim 1, wherein the detecting circuit comprises:
a voltage generating circuit, for generating a positive temperature coefficient voltage and a negative temperature coefficient voltage; and
a comparator, coupled to the voltage generating circuit, for comparing the positive temperature coefficient voltage with the negative temperature coefficient voltage to generate the indication signal.

7. The apparatus of claim 1, further comprising a storage unit for storing the indication signal.

8. The apparatus of claim 1, further coupled to an alert device utilized for generating an alert signal according to the indication signal.

9. The apparatus of claim 1, further coupled to a computer system, wherein the apparatus outputs an interrupt signal to inform the computer system when the detecting circuit generates the indication signal.

10. A protection method for a memory card control apparatus, the memory card control apparatus having a bus, the bus having a power signal transmission line to output a power signal, the method comprising:
detecting an operating status of the memory card control apparatus and generating an indication signal when the operating status exceeds a predetermined operating range; and
adjusting a current passing through the power signal transmission line according to the indication signal without cutting off the power signal to make the operating status operated within the predetermined operating range.

11. The method of claim 10, wherein the operating status is a current status passing through the power signal transmission line.

12. The method of claim 10, wherein the step of detecting the operating status of the memory card control apparatus comprises:
providing a predetermined current to generate a predetermined voltage; and
comparing the predetermined voltage with the power signal to generate the indication signal.

13. The method of claim 10, further comprising:
storing the indication signal in a storage unit; and
controlling operations of the memory card control apparatus according to the indication signal stored in the storage unit.

14. The method of claim 10, further comprising:
providing an alert device and utilizing the alert device to generate an alert signal according to the indication signal.

15. The method of claim 10, wherein the memory card control apparatus is further coupled to a computer system, and the method further comprises:
outputting an interrupt signal to inform the computer system when the indication signal is generated.

16. A protection method for a memory card control apparatus, the memory card control apparatus having a bus, the bus having a power signal transmission line to output a power signal, the method comprising:
detecting a temperature status of an ambient environment, and generating an indication signal when the temperature status of the environment exceeds a predetermined temperature range; and
adjusting a current passing through the power signal transmission line according to the indication signal without cutting off the power signal to make the temperature status of the ambient environment operated within the predetermined temperature range.

17. The method of claim 16, wherein the step of detecting the temperature status of the environment comprises:
generating a positive temperature coefficient voltage and a negative temperature coefficient voltage; and
comparing the positive temperature coefficient voltage with the negative temperature coefficient voltage to generate the indication signal.

18. The method of claim 16, further comprising:
storing the indication signal in a storage unit; and
controlling operations of the memory card control apparatus according to the indication signal stored in the storage unit.

19. The method of claim 16, further comprising:
providing an alert device and utilizing the alert device to generate an alert signal according to the indication signal.

20. The method of claim 16, wherein the memory card control apparatus is further coupled to a computer system, and the method further comprises:
outputting an interrupt signal to inform the computer system when the indication signal is generated.

* * * * *